United States Patent [19]

Millette et al.

[11] 4,053,827

[45] Oct. 11, 1977

[54] APPARATUS FOR MEASURING, AND INDICATING, THE THICKNESS OF A NON-METALLIC COATING ON AN ARCUATE METAL SURFACE

[75] Inventors: Louis Guy Millette, Pointe Claire; Peter Murphy, Longueuil; Georges Michel Miller, Chateauguay; Wieslaw Josef Tyszewicz, Dollard des Ormeaux, all of Canada

[73] Assignee: Northern Telecom Limited, Montreal, Canada

[21] Appl. No.: 698,008

[22] Filed: June 21, 1976

[30] Foreign Application Priority Data

Apr. 30, 1976 Canada .................. 251557

[51] Int. Cl.$^2$ .................................... G01R 33/12
[52] U.S. Cl. .................................. 324/34 TK
[58] Field of Search .............. 324/34 R, 34 TK, 34 E, 324/37, 40

[56] References Cited

U.S. PATENT DOCUMENTS

| 2,779,916 | 1/1957 | Poole | 324/34 E |
|---|---|---|---|
| 3,419,797 | 12/1968 | Libby | 324/40 |
| 3,760,264 | 9/1973 | Zumbach | 324/34 E |
| 3,919,628 | 11/1975 | Mandula et al. | 324/37 |

FOREIGN PATENT DOCUMENTS

| 213,317 | 9/1956 | Australia | 324/34 E |
|---|---|---|---|
| 574,618 | 1/1946 | United Kingdom | 324/34 E |
| 1,198,031 | 7/1970 | United Kingdom | 324/34 E |

Primary Examiner—Robert J. Corcoran
Attorney, Agent, or Firm—Sidney T. Jelly

[57] ABSTRACT

Apparatus for measuring, and indicating, the thickness of non-metallic coatings over a metallic surface, such as in sheathing of an electrical cable or similar structure, has a number of measuring heads, for example four, of electrical inductance type, spaced around the structure. A probe in each head has a profiled surface for presentation to the surface of the coating, the profile such as to offset any variation in inductance effects on the probe resulting from variation in diameter of the cable, without affecting the inductance effects of any variation in coating thickness. The measuring head is flexibly mounted and the signals from circuits associated with the probes are arranged to give visual indication of variation in coating thickness, and also any eccentricity. Particularly the indication can be a visual one representative of the cross section of the cable or the like.

6 Claims, 8 Drawing Figures

APPARATUS FOR MEASURING, AND INDICATING, THE THICKNESS OF A NON-METALLIC COATING ON AN ARCUATE METAL SURFACE

This invention relates to apparatus for measuring, and indicating, the thickness of non-metallic coatings over a metallic surface, such as in jacketting or sheathing of an electrical cable or similar structure.

To provide for the most economic use of coating or jacketting material it is desirable to keep the thickness of the jacket to a minimum comensurate with meeting specification requirements. Due to variations in the extrusion process, however, the thickness as extruded can vary, both locally and for the entire circumference of the cable or other structure. The jacket may be oval or offset axially. It is therefore necessary to provide some means for measuring the jacket thickness at various positions circumferentially of the cable and to give some indication either of the thickness at the measuring positions or of the variation from a datum thickness.

Capacitance type measuring devices are used widely for such purposes. Usually a measuring head is rotated about the axis of the cable, the head held stationary for a short predetermined time at predetermined angular positions around the cable. Thus, for example, the measuring head can be stepped round, being held stationary at positions spaced 45° apart.

There are certain disadvantages with such measuring heads. The presence of water affects the measurement, capacitance devices being extremely sensitive to water. Any variation in the jacketting material affects the measuring head requiring recalibration. This is important as with present day developments and variations in supply of raw materials, changes are often made in the extrusion material. Some such changes may be very minor insofar as the jacekt is concerned but still cause large variations in measurement sequels.

Introduction of new products also causes problems in that new calibration charts or tablets need to be prepared for each new product. Such changes of material and introduction of new products occur more frequently now than used to be the case, where the product, and its jacketting material, remained unchanged for a long time — for example years.

The present invention provides an apparatus which uses measuring heads of inductance type, having a unique form of probe for the measuring head, and providing indication of jacket thickness at a number of positions around the periphery of the cable, or like structure. The indication can be of various forms. Thus a chart recorder can be used, display meters indicating thickness or variation of thickness from datum can be used, or a visual display approximating the cross-section of the cable can be provided, giving a visual indication of wall thickness. More than one form of indicator can be provided, for example visual and chart recorder. Further, the signals indicative of thickness, or variation in thickness, can be used to provide feedback control of the extruding machine.

The invention will be understood by the following description in conjunction with the accompanying drawings in which.

Figure 1:
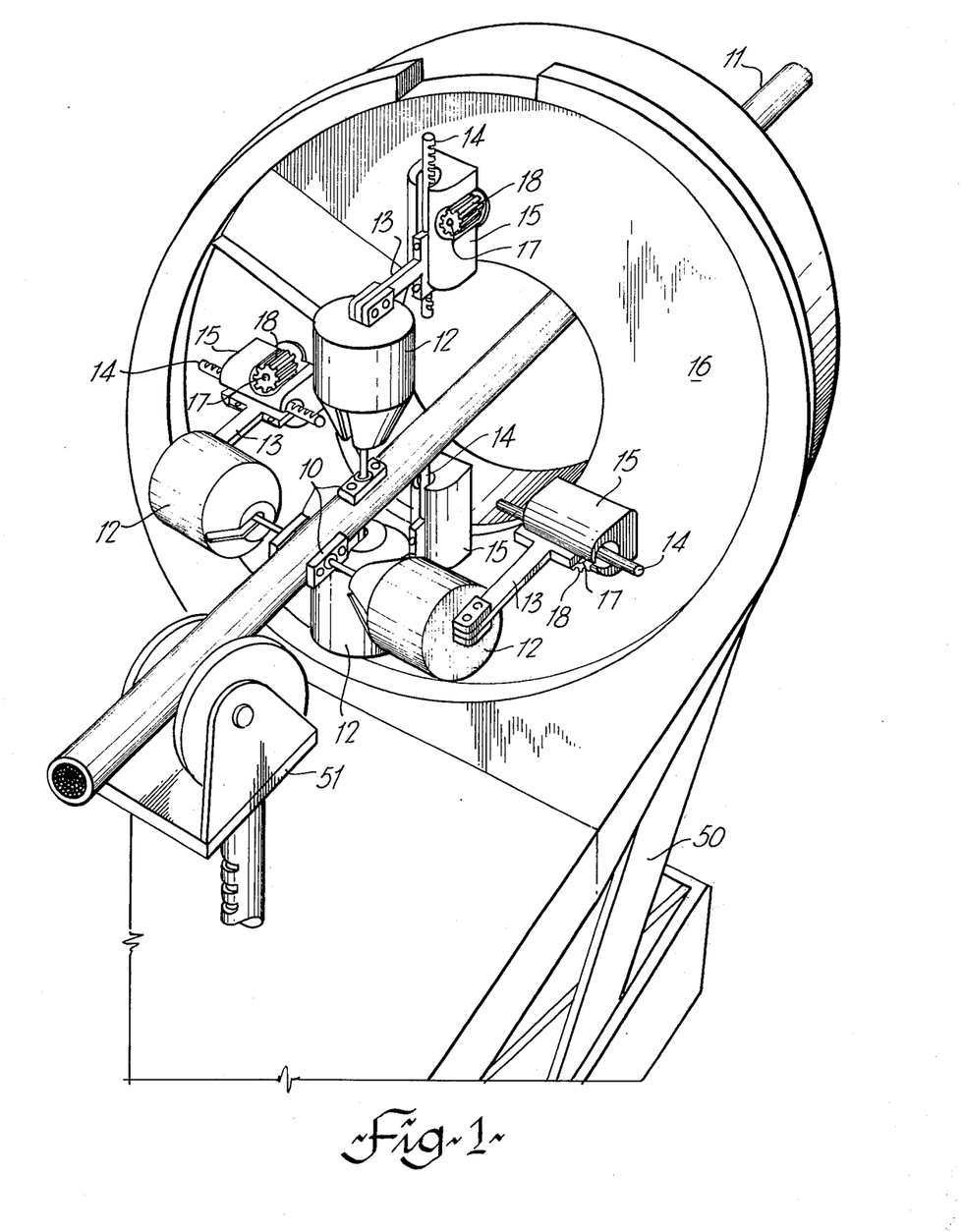
FIG. 1 is a perspective view of a measuring head structure.
Figure 3:
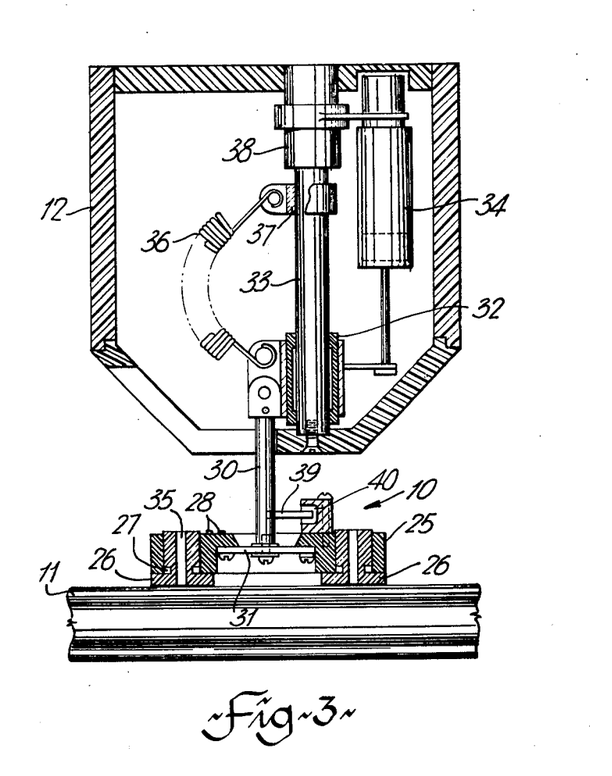
FIG. 3 is a cross-section through one form of measuring head.

FIG. 1 illustrates one form of measuring head structure or tracking assembly. As illustrated in FIG. 1, four measuring heads 10 are supported around a cable 11 at 90° intervals. Each measuring head 10 is supported from a housing 12 via a support structure as illustrated in FIG. 3 and described and illustrated in more detail in copending application Ser. No. 698,461 filed June 21, 1976 in the name of the present assignee.

The housings 12 are each supported by cantilevers 13 carried by radially slidable racks 14. The racks 14 are slidably supported by brackets 15 mounted on a support structure 16. Extruding axially from the support structure are four shafts 17 to the outer ends of which are fixedly attached pinions 18. A pinion 18 is adjacent to each bracket 15 and engages with the related rack 14.

Figure 2:
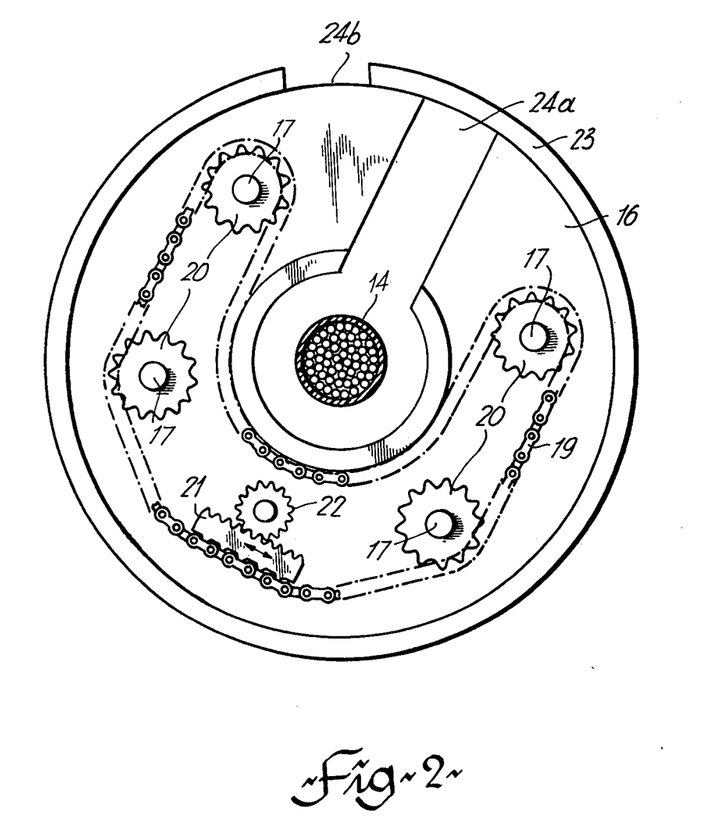
FIG. 2 is an end view of the structure of FIG. 1, illustrating the actuating mechanism.

At rear of the structure 16 each shaft 17 has a chain gear on its rear end, the chain passing over each chain gear and being moved by a sector gear and motor. FIG. 2 illustrates diagrammatically an arrangement of chain 19 and chain gear 20, the sector gear 21 and a drive gear 22 from a motor-not shown. Actuation of the motor rotates the drive gear-in in one direction or the other-moving the sector gear 21 and thus chain 19. This in turn rotates the shafts 17 via the gears 20, and in turn rotates pinions 18 to move the racks 14, with the measuring heads 10, radially in or out. Such movement will occur on initial setting up or breaking down of the apparatus, or to avoid a bump in the cable. A bump detector can be provided upstream of the apparatus and arranged to actuate the motor to withdraw the heads 10.

The structure 16 is mounted within an outer ring 23, and can rotate within the ring to a limited extent. A gap 24a is provided in the structure 16 and a similar gap 24b in the ring 23. By aligning the gaps, the whole apparatus can be lowered from around a cable by the support structure 50. It can also of course, be raised up around a cable. The cable 11 is supported on either side of the structure 16 by moveable supports 51, one of which is seen in FIG. 1.

FIG. 3 illustrates one particular form of measuring head and support system, not forming part of the present invention, and described in more detail in the aforesaid application. The measuring head 10 comprises elongated housing 25 having two probes 26 mounted thereon, one at each end of the housing 25. One probe is active and one inactive. A coil 27 is positioned on at least the active probe and is part of an oscillator circuit, via terminals 28.

The use of two probes assists in obtaining efficient tracking and location of the measuring head 10 relative to the cable or other structure indicated at 11. However other means such as a roller or the like can be used instead of the inactive probe.

The measuring head 10 is attached to a support rod 30 via a flexible diaphragm 31. The rod 30 is in turn attached to a slide member 32 slidable on a rod 33. A damper 34 damps movement of the slide member 32. A spring 36, extending between a fixed bracket 37 on the rod 33 and the slide member 32 biases the slide member towards the outer end of the rod 33. The rod 33 at its inner end is attached to a support member 38 which is part of the housing 12 (FIG. 1). To restrict the movement of the head 10 beyond desirable limits, a short projecting member 39 on the rod 30 moves within an enclosure 40 on the housing 25. A bore 35 extends through the probe 26 and a tuning element such as a slug or core of appropriate material, for example, ferrite, can be inserted in bore 35.

Other forms of measuring head 10 can be provided, and only one probe need be provided, with some means for ensuring correct tracking and alignment. A certain degree of freedom of movement of the head 10 relative to the support means, i.e. rods 30 and 33 and slide member 32, is provided.

The probes are normally in contact with and slide on, the surface of the cable. Variations in diameter of the cable are likely to cause variations in the measurements obtained. To provide for effective measurement the profile of the contacting surface of the probe is of a predetermined form. A probe 26 is seen in cross-section in FIG. 4, the contact surface indicated at 45. The profile of the surface 12 is obtained from calibration data. To obtain the calibration data, a flat detector surface is set up and a series of mandrels of different known diameters successively positioned first in contact with the surface and then moved away in small predetermined steps. Thus, for example, a 0.5 inch diameter metal mandrel is first positioned in contact with the detector, which is part of an oscillator circuit, and a note made of the frequency or some other sequel output, of the oscillator circuit. The mandrel is then moved away in small steps - for example 0.005 inch each step, and a series of readings obtained. The same procedure is carried with further mandrels, for example 0.75 inches and 1.0 inches.

Figure 5:
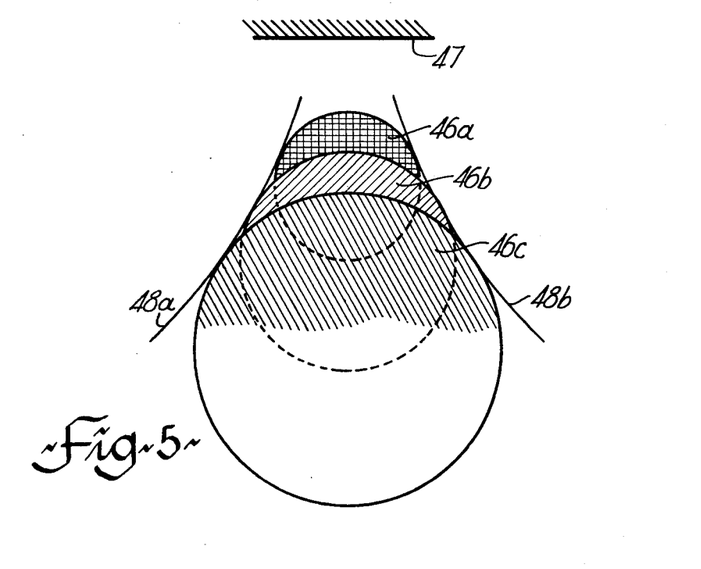
FIG. 5 is a diagrammatic representation of a method of obtaining the profile of the probe.

There are thus obtained three tables, called calibration tables. From these tables it is possible to ascertain at what distance each mandrel must be positioned from the detector surface to give the same calibration reading. It is possible to draw or represent these positions graphically and draw in a curve which is tangential to each mandrel - or representation thereof. This is illustrated in FIG. 5. The positions of three mandrels is indicated at 46a, 46b and 46c, at positions from a flat detector surface 47, where the magnetic influence of the various mandrels on the probe and associated oscillator circuit is the same. Curves 48a and 48b are then drawn as tangents to the circles representative of the mandrels 16a, 16b and 16c. These two curves form the profile of the surface 45 for the probe.

Figure 6:
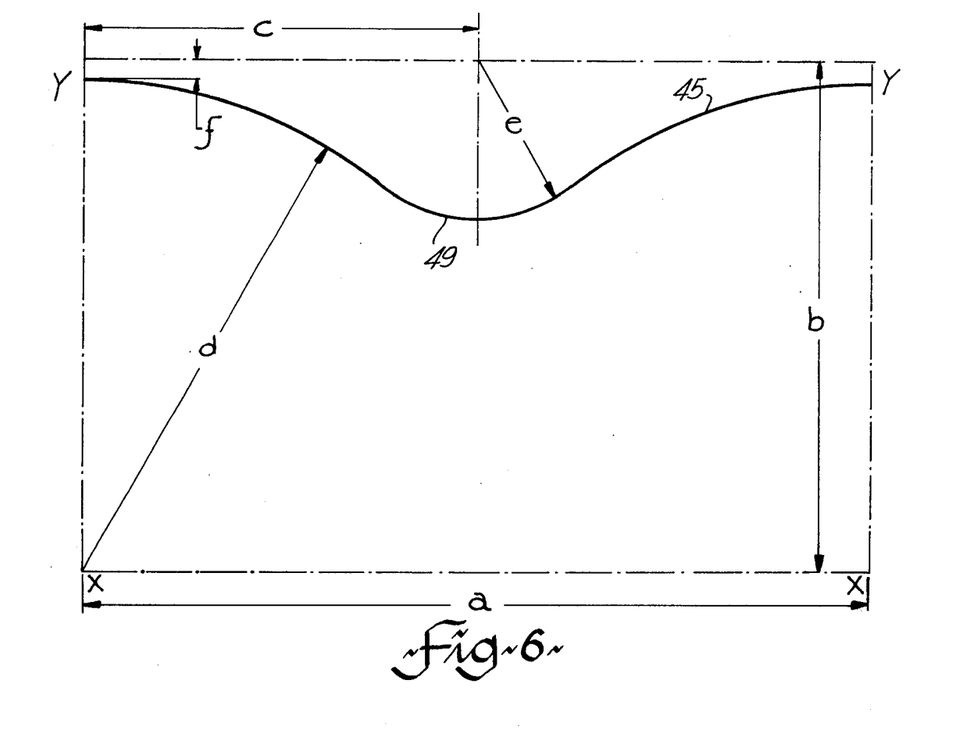
FIG. 6 is an enlarged view of the profile of the probe.

A typical profile is shown, enlarged, in FIG. 6. Typical values for the various parameters are: $a = 0.884$ inches; $b = 0.575$ inches; $c = 0.442$ inches; $d = 0.550$ inches; $e = .175$ inches; $f = 0.025$ inches. The important reference points are those designated x and y in FIG. 6.

While the curve has been described as being obtained graphically, as illustrated in FIG. 5, this is a relatively lengthy and not very accurate method and is described for illustrative purposes. Modern computer technology enable the curves 48a and 48b of FIG. 5 to be calculated from the information in the calibration data and tables, previously referred to. Also, once various readings have been obtained with the various mandrels relative to the detector surface, calibration tables at closer spacings can be obtained by computer usage.

Figure 4:
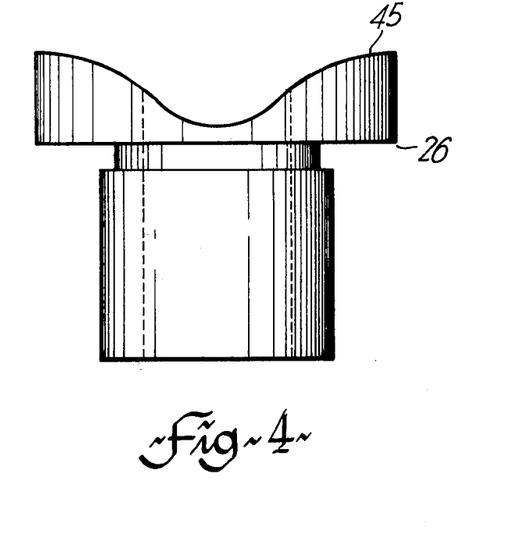
FIG. 4 is a side view of one form of probe.

The bottom portion 49 of the surface 45 is not important. The only requirement is that it not touch the surface of the smallest cable to be measured. A typical material for the probe is "Henium", a ceramic material having good wear resistance and low friction. It is difficult to machine and therefore manufacturing problems will tend to dictate the shape of the unimportant portion 49 of the profile.

The coils on the probes, as described above, are parts of oscillator circuits, the frequency of which is varied by variations in the inductive effect of the probe, resulting from variations in the distance of the metallic surface from a datum on the probe. Such variations of frequency can be utilized to produce signals indicative of the variation in thickness of the non-metallic coating, such as on dial indicators and/or chart recorders.

A particularly useful way of indicating variation in thickness is to produce a display representative of the cross-section of the article being monitored.

Figure 7:
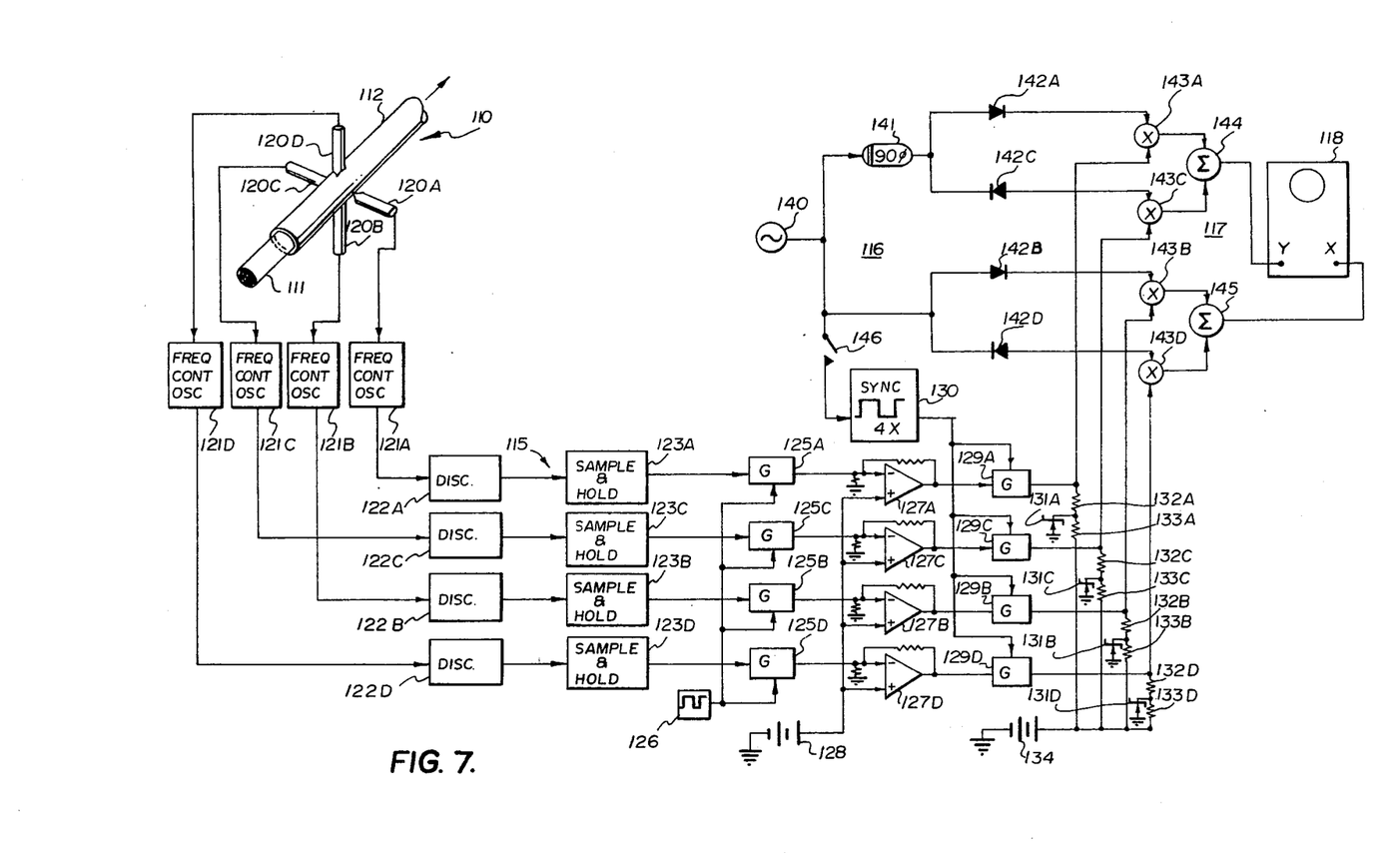
FIG. 7 is a block schematic circuit diagram of a converter for visually displaying a quasi cross-section of the wall thickness and eccentricity of a cable sheath.
Figure 8:
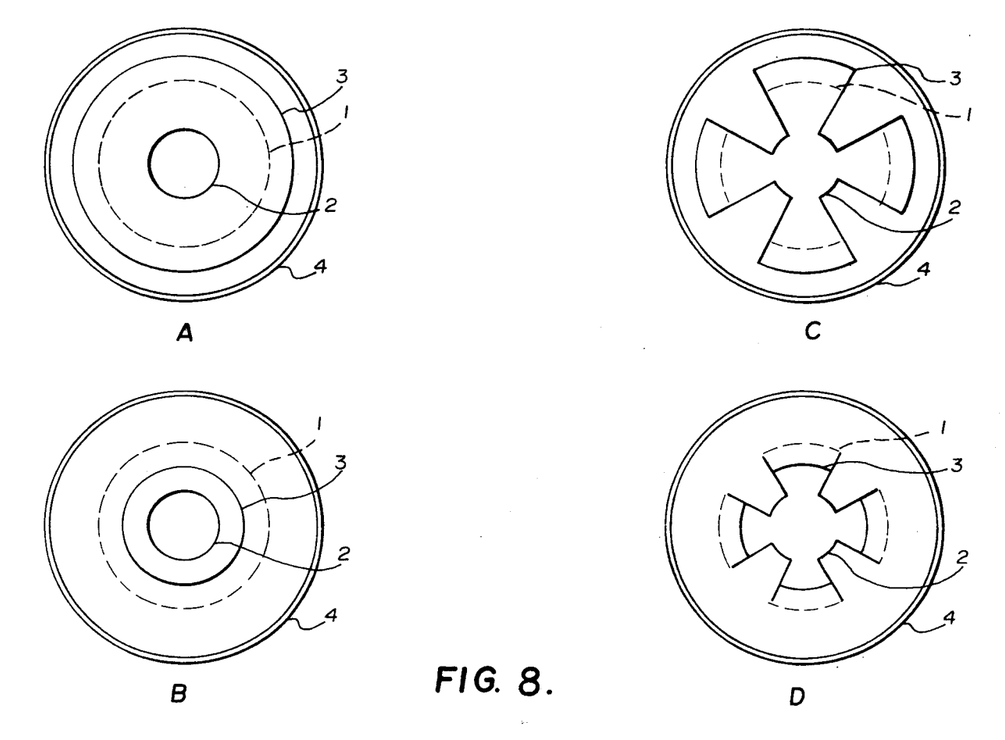
FIG. 8 illustrates typical waveforms displayed on an oscilloscope which is fed from the converter illustrated in FIG. 7.

FIGS. 7 and 8 illustrate respectively, a circuit for visually displaying a quasi cross-section of a cable sheath, and typical waveforms of the display.

In the following detailed description four identical channels are utilized to derive four d-c control voltages. Identical elements in each of the channels are identified by similar reference numerals followed by additional reference characters. However, only the reference numerals will be referred to unless a particular element is being identified.

Referring to FIG. 7, the converter is functioning to visually display the quasi-thickness and eccentricity of a portion of a cable 110 having a core 111 and an outer sheath 112. The converter generally comprises a circuit generally 115, for developing d-c control voltages which are proportional to the thickness of the sheath 112 at four circumferential points. In addition, the converter includes a quadrature oscillator 116, and a network 117 for multiplying and summing the d-c voltages from the circuit 115 with those of the quadrature oscillator 116 to produce output voltages which are used to drive an oscilloscope 118. The detailed structure of the converter will be manifest from the following discussion of its detailed function and operation.

In a typical application, the cable 110 is advanced between four inductive probes 120 which are displaced at 90° with respect to each other around the cable 110. The inductive probes 120 form part of the frequency determining portion of frequency controlled oscillators 121, having a nominal frequency of 1.25MHz. The thickness of the cable sheath 112 adjacent the probes 120 produces varying eddy currents and/or reluctance therein, which in turn independently alters the frequency of each of the oscillators 121. The output signals from each of the oscillators 121 are fed to discriminators 122 which produce varying d-c voltages that are centered about a nominal reference thickness of the cable sheath 112. Thus, a variation of ±20 mils in the thickness of the cable sheath 112 develops a voltage of ±5 volts at the output of the discriminator 122. In order to eliminate the instantaneous variations in the thickness of the sheath 112, the varying d-c output voltages from the discriminators 122 are fed to sample and hold networks 123 having selectable sample periods which vary from 2 to 80 seconds.

The varying d-c output voltages from the sample and hold networks 123 are coupled to the inputs of gates 125, each of which is controlled by a 60 cycle square-wave oscillator having a 90% duty cycle. The square-wave signal from the oscillator 126 is utilized to open the gates 125 thereby coupling the output signals from the sample and hold networks 123 to the inverting inputs of operational amplifiers 127. The non-inverting inputs of the amplifiers 127 are connected to a nominal +10 volt reference 128 source. Also, the amplifiers 127 utilize heavy negative feedback (as indicated by the unnumbered resistors) to maintain unity gain therethrough. The input signals to the inverting inputs can vary between −10 and +10 volts; hence, the output signals from the amplifiers 127 can vary between 0 and +20 volts respectively. These output signals are coupled to the input of gates 129 which in turn are controlled by the output of a nominal 4 KHz square-wave oscillator 130 having a 50% duty cycle.

The outputs of the gates 129 are clamped to a minimum voltage of 5 volts by zener diodes 131, and series connected resistors 132 and 133 coupled to a nominal +10 volt source 134. Thus, when the gates 129 are open, their outputs are either the output of the amplifiers 127 or the zener diode voltage, whichever is the greater.

The quadrature oscillator 116 comprises a 1 KHz sinusoidal oscillator 140, one output of which is fed through a 90° phase shift network 141. Another output from the oscillator 140 and the output of the phase shift network 141 are each half-wave rectified by diodes 142 to produce four half-wave signal voltages. The two positive going half-wave signals from the diodes 142A and 142B are coupled to the inputs of multipliers 143A and 143B respectively, while the two negative going half-wave signals from the diodes 142C and 142D are coupled to the inputs of multipliers 143C and 143D respectively. These half-wave signals are multiplied by the varying d-c output signals from the gates 129 in the multipliers 143 to produce four half-wave output signals (two positive going and two negative going) which are displaced 90° with respect to each other, and that are proportional to the magnitudes of the signals from the gates 129. The half-wave signals from the multipliers 143A and 143C having a 180° phase and an opposite polarity relationship, are connected to the inputs of a summing amplifier 144. Similarly, the two half-wave signals from the multipliers 143B and 143D are connected to the inputs of a summing amplifier 145. The outputs of the summing amplifiers 144 and 145 provide the required Y and X drive signals respectively for the oscilloscope 118.

A better understanding of the operation of the converter may be had by additional reference to FIG. 8 which illustrates typical waveforms displayed on the oscilloscope 118. The following references are used for each of these waveforms:

1. Nominal reference thickness of cable sheath.
2. Minimum allowable thickness of cable sheath.
3. Actual wall thickness of cable sheath.
4. Maximum allowable thickness of cable sheath.

In each of these waveforms, the nominal reference wall thickness 1 is determined by the voltage from the nominal source 128; the minimum allowable wall thickness 2 is determined by the voltage across the zener diodes 131; the actual wall thickness 3 is determined by the voltage generated by the sample and hold networks 123; and the maximum allowable wall thickness 4 corresponds to the maximum diameter of the oscilloscope graticule.

Waveform A illustrates a condition when the actual wall thickness (3) is greater than the nominal reference thickness (1), while waveform B illustrates a condition when the actual wall thickness (3) is less than the nominal reference thickness (1). As originally described, the square-wave oscillator 130 is free running at approximately 4 times that of the sinusoidal oscillator 140. If, however the square-wave oscillator 130 is synchronized to 4 times that of the oscillator 140 by closure of a switch 146, waveforms A and B will then appear as waveforms C and D respectively. The waveforms represent a quasi cross-section of the cable sheath 112 in which the critical portion has been expanded to illustrate minor variations in the actual wall thickness. The quasi cross-section is derived from the measurements recorded by the four probes 120 which are equally spaced around the cable. In a typical embodiment, the gains and magnitudes of the various voltage sources are adjusted so that the radius of the arc or circles represents the nominal reference thickness of the cable sheath ±20 mils. Thus, when the cable thickness is −20 mils from nominal, circles 2 and 3 will coincide. Conversely, when the sheath thickness is +20 mils from nominal, the diameter of circle 3 will coincide with the periphery of the oscilloscope graticule 4. Similarly, when the actual wall thickness of the cable coincides with the required nominal reference thickness circles 1 and 3 will coincide. Thus, an operator, by a quick glance at a visual display on the oscilloscope 118, can ascertain whether the sheath 112 being applied to the core 111 is over or under size and whether or not there is an eccentricity in it.

The waveforms in FIG. 8 are developed as follows: when the gates 129 are closed, their outputs applied to the multipliers 143 revert to the +5 volts across the zener diodes 131. Since the square-wave generator 130 has a 50% duty cycle, this provides a relatively strong trace 2. When the gates 129 are open, the half-wave voltages from the sinusoidal generator 140 are multiplied by the varying d-c voltages from the outputs of the operational amplifiers 127. During 10% of the time when the gates 125 are closed, and their outputs are 0 volts, the outputs from the amplifiers 127 will be +10 volts which is derived from the voltage source 128 thus providing the nominal reference circuit 1. However, during the other 90% of the time when the gates 125 are open, the voltage at the outputs of the amplifiers 127 will be the difference between the voltage from the sources 123 and 128. Since the voltage from the networks 123 can vary between −10 and +10 volts, which represents a range of thickness in the cable sheath 112, the outputs from the amplifiers 127 can vary between 0 and +20 volts. However, since the output of the gates 129 are clamped to a minimum voltage of +5 volts by the zener diodes 131, they cannot fall below this value. This represents a −20 mil tolerance in the sheath 112. Conversely, a voltage of +15 volts on the outputs of the amplifiers 127 corresponds with the maximum diameter of the graticule 4 and represents +20 mils oversize from the nominal reference thickness of the sheath 112. The 90% duty cycle from the square-wave oscillator 126 is selected so that the intensity of the nominal reference thickness 1 displayed on the oscilloscope will be much less than that of the actual wall thickness 3.

In the present embodiment, four separate circuits 115 are utilized to develop the d-c sample and hold voltages for control of the quadrature oscillator 116. In an alternate embodiment, the probes 120 may be periodically switched to a single oscillator through a single discriminator with the output being concurrently switched to the sample and hold networks 123. In still another embodiment, a single probe 120 can be rotated about the cable 110 rather than utilizing four probes 120. Again, the output of the single discriminator would be periodically switched in unison with the rotation of the probe to the sample and hold circuits 123.

What is claimed is:

1. Apparatus for measuring, and indicating, the thickness of a non-metallic coating on an arcuate metal surface, comprising:
   at least one measuring head for positioning relative to said coating;
   at least one support member on each measuring head for supporting said measuring head relative to said coating;
   a sensing member on each measuring head and arranged to develop a signal representative of the distance between said sensing member and said arcuate metal surface;
   a profiled surface on said support member for presentation to said coating, said profiled surface having a Vee shape with convex arcuate sides when viewed in a direction parallel to the axis of the arcuate metal surface, the arcuate sides initially defined by sequentially positioning a series of metal cylindrical mandrels of different diameters relative to the sensing member with the axes of the mandrels lying in a common plane normal to the sensing member, so as to develop a signal of the same magnitude from the sensing member for each mandrel, each arcuate side being a curve which is tangential to the peripheries of the mandrels at these respective positions, the penetration of said arcuate metal surface and coating into said Vee shape varying with the outer diameter of the coating to offset variations in the signals resulting from variations in the outer diameter of the non-metallic coating;
   signal processing means connected to said sensing member, for processing said signal from said sensing member;
   means connected to said signal processing means for displaying an output therefrom, said output indicative of the thickness of said non-metallic coating.

2. Apparatus as claimed in claim 1, for measuring and indicating the thickness eccentricity of a non-metallic coating on a metallic surface of cables and similar structures comprising a plurality of measuring heads spaced equidistant around said cable.

3. Apparatus as claimed in claim 2, comprising four heads spaced equidistant around said cable.

4. Apparatus as claimed in claim 3, said signal processing means and, means for displaying an indication of said thickness of said non-metallic coating comprise:
   means responsive to the output of the sensing member for generating separate d-c voltages which are proportional to the instant thickness of the non-metallic coating;
   a quadrature oscillator comprising an oscillator and a 90° phase shift network for generating two outputs 90° out of phase, and half-wave rectifying means connected to each output for producing four half-wave sinusoidal voltages displaced at 90° with respect to each other;
   means for multiplying the four half-wave sinusoidal voltages by the respective d-c voltages to produce four half-wave control voltages;
   means for summing the half-wave control voltages which are 180° out of phase with each other to produce two full-wave control voltages; and
   an oscilloscope, having X and Y inputs, the two full wave control voltages applied to the X and Y inputs.

5. Apparatus as claimed in claim 4, which additionally comprises:
   first means for periodically switching each of the separate d-c voltages to a predetermined first reference level which is representative of the minimum allowable thickness of the non-metallic coating.

6. Apparatus as claimed in claim 5, which additionally comprises:
   second means for periodically switching each of the separate d-c voltages to a predetermined second reference level which is representative of a nominal reference thickness of the non-metallic coating.

* * * * *